United States Patent
Ichikawa et al.

(10) Patent No.: US 10,356,333 B2
(45) Date of Patent: *Jul. 16, 2019

(54) IMAGE PICKUP APPARATUS AND IMAGE PICKUP SYSTEM WITH INCREASED SATURATION CHARGE QUANTITY OF PIXELS

(71) Applicant: CANON KABUSHIKI KAISHA, Tokyo (JP)

(72) Inventors: Takeshi Ichikawa, Hachioji (JP); Masahiro Kobayashi, Tokyo (JP); Yusuke Onuki, Fujisawa (JP); Toru Koizumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/881,548

(22) Filed: Jan. 26, 2018

(65) Prior Publication Data

US 2018/0152613 A1 May 31, 2018

Related U.S. Application Data

(63) Continuation of application No. 15/387,487, filed on Dec. 21, 2016, now Pat. No. 9,924,106, which is a continuation of application No. 14/645,233, filed on Mar. 11, 2015, now Pat. No. 9,560,285.

(30) Foreign Application Priority Data

Mar. 14, 2014 (JP) ................................ 2014-052327

(51) Int. Cl.
*H04N 5/235* (2006.01)
*H04N 5/378* (2011.01)
*H04N 5/374* (2011.01)
*H04N 5/3745* (2011.01)
*H04N 5/353* (2011.01)

(52) U.S. Cl.
CPC .......... *H04N 5/2353* (2013.01); *H04N 5/353* (2013.01); *H04N 5/3532* (2013.01); *H04N 5/374* (2013.01); *H04N 5/378* (2013.01); *H04N 5/3745* (2013.01); *H04N 5/37452* (2013.01)

(58) Field of Classification Search
CPC ...... H04N 5/2353; H04N 5/353; H04N 5/374; H04N 5/3532; H04N 5/3745; H04N 5/378; H04N 5/37452
USPC ........................................................ 348/296
See application file for complete search history.

(56) References Cited

U.S. PATENT DOCUMENTS

2011/0221940 A1\* 9/2011 Kato .................... H04N 5/3745
348/250
2013/0300904 A1\* 11/2013 Sugiyama ............ H04N 5/3597
348/300

\* cited by examiner

*Primary Examiner* — Lin Ye
*Assistant Examiner* — Chan T Nguyen
(74) *Attorney, Agent, or Firm* — Canon U.S.A., Inc. IP Division

(57) ABSTRACT

An image pickup apparatus performs a global electronic shutter operation in which exposure periods of a plurality of pixels coincide with one another. In a first period in which a photoelectric conversion unit of at least one of the pixels stores charge, signals based on charges stored in holding units of the pixels are successively output to output lines. In a second period after the output of the signals from the pixels is terminated, the holding units of the pixels hold charge.

27 Claims, 13 Drawing Sheets

IMAGE PICKUP APPARATUS AND IMAGE PICKUP SYSTEM WITH INCREASED SATURATION CHARGE QUANTITY OF PIXELS

CROSS-REFERENCE TO RELATED APPLICATION

This is a Continuation of U.S. Ser. No. 15/387,487 filed Dec. 21, 2016 which is a Continuation of U.S. application Ser. No. 14/645,233 filed Mar. 11, 2015, now an issued patent U.S. Pat. No. 9,560,285 issue date Jan. 31, 2017, which claims priority from Japanese Patent Application No. 2014-052327, filed Mar. 14, 2014, which are hereby incorporated by reference herein in its entirety.

BACKGROUND OF THE INVENTION

Field of the Invention

The present disclosure relates to an image pickup apparatus and an image pickup system.

Description of the Related Art

In recent years, employment of a global electronic shutter in CMOS image sensors has been proposed. Image pickup apparatuses disclosed in Japanese Patent Laid-Open Nos. 2004-111590 and 2006-246450 have an advantage in that, even when an image of a quickly moving object is captured, the object image is not distorted.

SUMMARY OF THE INVENTION

According to an aspect of the present disclosure, an image pickup apparatus includes a plurality of pixels. Each pixel includes a photoelectric conversion unit configured to generate charge in response to incident light and to accumulate the charge, a holding unit configured to hold the charge, an amplification unit configured to output a signal based on the charge, a first transfer switch configured to transfer the charge from the photoelectric conversion unit to the holding unit, and a second transfer switch configured to transfer the charge from the holding unit to the amplification unit. The image pickup apparatus includes an output line to which the signals from the plurality of pixels are output. At a first time point, the photoelectric conversion units of the plurality of pixels start accumulation of charge. The first transfer switch of at least one of the plurality of pixels is kept off from the first time point to a second time point and the photoelectric conversion unit of the at least one of the plurality of pixels accumulates charge generated in a first period from the first time point to the second time point. In the first period, the second transfer switches of the plurality of pixels are turned on and the amplification units of the plurality of pixels output the signals to the output line. In a second period from the second point to a third point, the holding units of the plurality of pixels hold charge generated by the photoelectric conversion units in the first period and charge generated by the photoelectric conversion units in the second period. At the third time point, the first transfer switches of the plurality of pixels are controlled from on to off.

According to an aspect of the present disclosure, an image pickup apparatus includes a plurality of pixels. Each pixel includes a photoelectric conversion unit configured to generate charge in response to incident light and to accumulate the charge, a holding unit configured to hold the charge in a portion different from the photoelectric conversion unit, and an amplification unit configured to output a signal based on the charge. The image pickup apparatus includes an output line to which the signals from the plurality of pixels are output. Charge generated in a first period is accumulated in the photoelectric conversion units of the plurality of pixels. During a second period following the first period, the holding units of the plurality of pixels hold charge generated by the photoelectric conversion units in the first period and charge generated by the photoelectric conversion units in the second period. In each of the plurality of pixels, charge held by the holding units is read to the amplification units in the first period.

Further features of the present disclosure will become apparent from the following description of exemplary embodiments with reference to the attached drawings.

DESCRIPTION OF THE EMBODIMENTS

Figure 1:
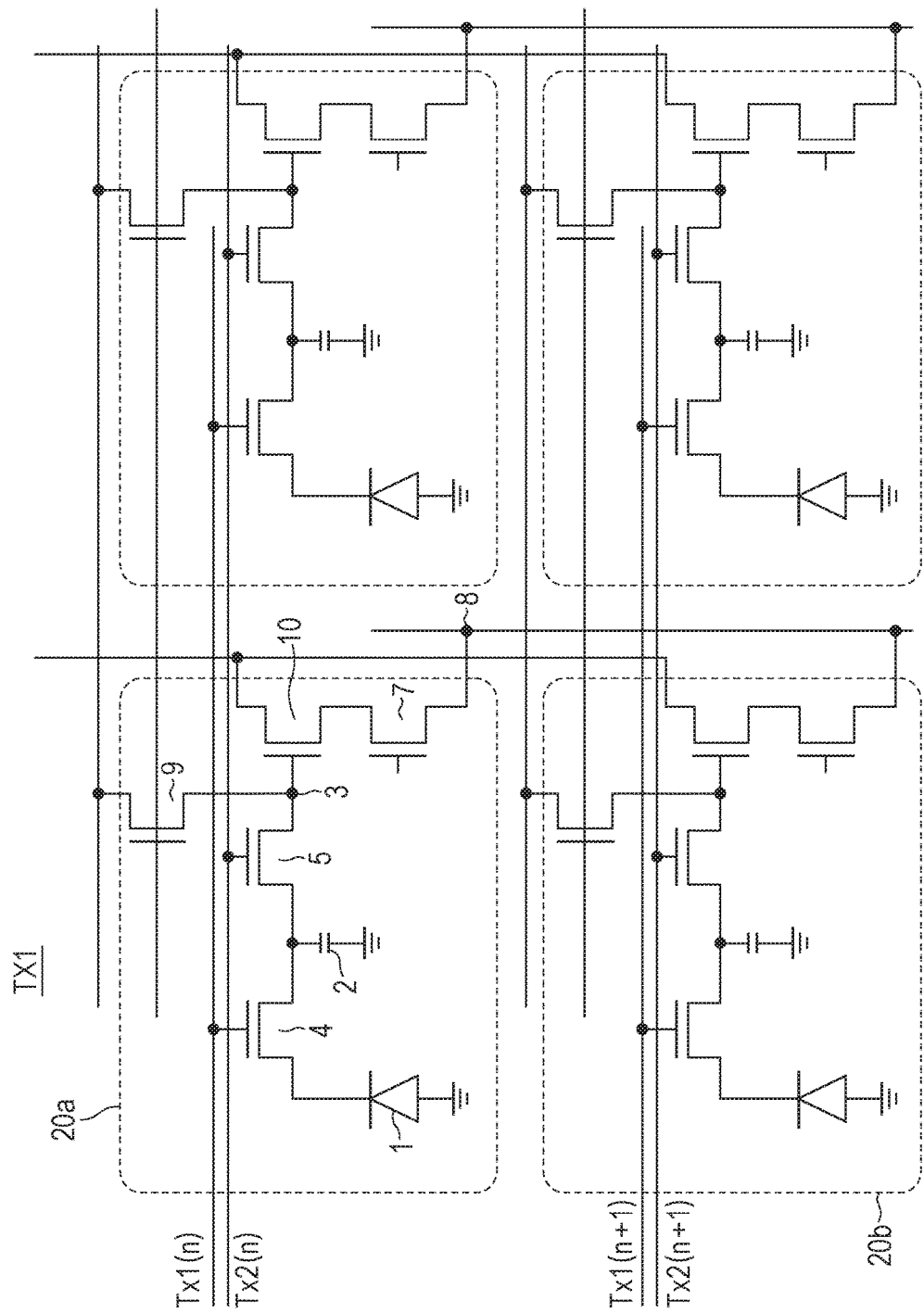
FIG. 1 is a diagram illustrating an equivalent circuit of an image pickup apparatus.

According to embodiments below, a global electronic shutter may be operated while saturation charge quantity, or saturation charge amount, may be improved.

In an image pickup apparatus disclosed in Japanese Patent Laid-Open No. 2004-111590, all charges generated by photoelectric conversion for obtaining one image or one frame are accumulated in photoelectric conversion units. Thereafter, the charges in all pixels are simultaneously transferred from the photoelectric conversion units to holding units, and photoelectric conversion is started to obtain a next image or a next frame. Therefore, in order to increase saturation charge quantity of the pixel, saturation charge quantity of the photoelectric conversion unit and saturation charge quantity of the holding unit are substantially the same. When the saturation charge quantity of the photoelectric conversion unit increases, an area of the photoelectric conversion unit increases. Therefore, a size of the pixel may increase.

In the image pickup apparatus disclosed in Japanese Patent Laid-Open No. 2006-246450, the photoelectric conversion unit does not accumulate charges but the holding unit stores almost all the charges. Therefore, saturation charge quantity of pixel may be increased without increasing saturation charge quantity of the photoelectric conversion unit. However, a period in which generated charges are not allowed to be stored exists in this method, and therefore, image quality may be degraded.

The inventers found that, in some image pickup apparatuses, it is difficult to increase saturation charge quantity of pixels. According to some embodiments described herein, in an image pickup apparatus which employ a global electronic shutter, saturation charge quantity of pixels may be increased.

An embodiment provides an image pickup apparatus including a plurality of pixels and an output lines to which signals are supplied from the plurality of pixels. Each of the pixels includes a photoelectric conversion unit, a holding unit which holds charge, and an amplification unit which outputs a signal based on the charge. Each of the pixels further includes a first transfer switch which transfers charge from the photoelectric conversion unit to the holding unit and a second transfer switch which transfers charge from the holding unit to the amplification unit. With this configuration, an image pickup operation in which photoelectric conversion periods coincide, that is, the so-called "global electronic shutter", may be operated. An electronic shutter is, for example, defined as to electrically control accumulation of charge that has been generated in response to incident light. A transfer switch (or transistor) and/or a discharging switch (or transistor) may be used to define the period of accumulation.

In embodiments of the present disclosure, photoelectric conversion units of pixels simultaneously start accumulation, or storage, of charge at a first time point. A first transfer switch of at least one of the pixels is kept being off from the first time point to, or until, a second time point. In the at least one of the pixels, charge generated in this period of time is accumulated, or stored, in the photoelectric conversion unit. The period from the first time point to the second time point corresponds to a first period. In other words, the first period may be defined as starting at the first time and ending at the second time.

In the first period, the output units of the pixels output signals based on charges held in holding units of the pixels to the output line in turns, or successively. In other words, each of the pixels outputs at least one signal in the first period. Specifically, the first transfer switches of the pixels are turned on in the first period in turns. Since the charges generated in the first period are accumulated in the photoelectric conversion units, the holding units may hold, in the first period, charges generated before the first time point.

The number of signals output in the first period may be changed depending on a format of an image to be output. In a case of shooting of moving images, for example, it is sufficient that a number of signals corresponding to the number of horizontal lines used for one frame are output. In such an embodiment, it is not necessarily the case that all the pixels included in the image pickup apparatus output signals.

After signals are output from the pixels, the holding units of the pixels hold, or store, charges at least in a second period from the second time point to a third time point. The second period may be defined as starting at the second time and ending at the third time. During the second period, the holding units hold the charges generated in the first period and the charges generated in the second period. At the third time point, the first transfer switches of the pixels are simultaneously controlled from an on state to an off state. In other words, at the third time point, the first transfer switches of the pixels are simultaneously controlled from being on to being off.

Since the photoelectric conversion units at least store the charges generated in the first period, even if saturation charge quantity of the photoelectric conversion units are small, saturation charge quantity of the pixels may be maintained or even increased. Accordingly, with this configuration, the global electronic shutter may be operated while the saturation charge quantity may be maintained. Note that, in some embodiments, the second period in which the holding units of the pixels hold charges is longer than the first period. This is because, in a case that the second period is longer than the first period, the saturation charge quantity of the photoelectric conversion units may be reduced.

The embodiments of the present disclosure will be described hereinafter with reference to the accompanying drawings. Embodiments of the present disclosure are not limited to the embodiments described below. For example, an embodiment in which a configuration of a portion of one of the embodiments below is added to one of the other embodiments and an embodiment in which a configuration of a portion of one of the embodiments below is replaced by a configuration of a portion of one of the other embodiments are also included in the embodiments of the present disclosure. Furthermore, in the embodiments below, a first conductivity type is an N type and a second conductivity type is a P type. However, the first conductivity type may be a P type and the second conductivity type may be an N type.

First Embodiment

A first embodiment will be described. FIG. 1 is a diagram illustrating equivalent circuits of pixels of an image pickup apparatus. Although four pixels 20 are illustrated in FIG. 1, the image pickup apparatus includes more pixels.

Each of the pixels 20 includes a photoelectric conversion unit 1, a holding unit 2, an amplification unit 10, a first transfer switch 4, and a second transfer switch 5. Each of the pixels 20 further includes a reset transistor 9 and a selection transistor 7.

The photoelectric conversion unit 1 generates charge in response to incident light. The photoelectric conversion unit 1 accumulates, or stores, charge generated in response to incident light. The first transfer switch 4 transfers the charge of the photoelectric conversion unit 1 to the holding unit 2. The holding unit 2 holds the charge generated by the incident light in a portion other than the photoelectric conversion unit 1. The second transfer switch 5 transfers the charge of the holding unit 2 to an input node 3 of the amplification unit 10. The reset transistor 9 resets a voltage of the input node 3 of the amplification unit 10. The selection transistor 7 selects a corresponding one of the pixels 20 which outputs a signal to an output line 8. The amplification unit 10 outputs a signal based on the charge generated by the incident light to the output line 8. The amplification unit 10 is a source follower, for example. Furthermore, the first transfer switch 4 and the second transfer switch 5 are MOS transistors.

A control line Tx1 is connected to the first transfer switch 4. A control line Tx2 is connected to the second transfer switch 5. In this embodiment, a plurality of pixels are arranged in a matrix. A common control line is connected to pixels in the same row. Therefore, a control line Tx1(n) is connected to pixels in an n-th row.

With this configuration, charges generated while the holding units 2 hold charges may be stored in the photoelectric conversion units 1. Accordingly, an image pickup operation in which periods of time in which photoelectric conversion is performed in the pixels match one another, that is, the so-called "global electronic shutter" may be operated.

Figure 2:
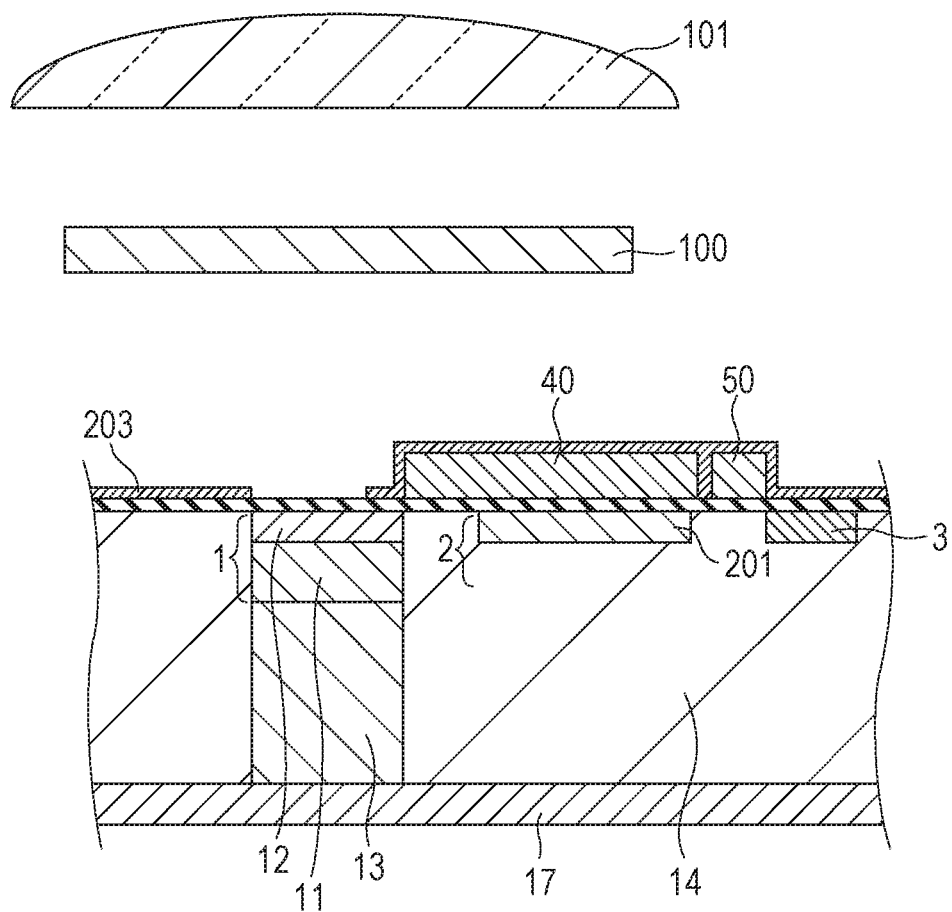
FIG. 2 is a diagram schematically illustrating a cross-section structure of the image pickup apparatus.

FIG. 2 is a diagram schematically illustrating a cross-section structure of the image pickup apparatus. In FIG. 2, a cross section of one of the pixels 20 is illustrated. Portions having functions the same as those of the portions in FIG. 1 are denoted by reference numerals the same as those of FIG. 1. Although a surface irradiation type image pickup apparatus is illustrated in FIG. 2, a back surface irradiation type image pickup apparatus may be employed.

The photoelectric conversion unit 1 has an embedded photodiode structure. The photoelectric conversion unit 1 includes an N-type semiconductor region 11 and a P-type semiconductor region 12. The N-type semiconductor region 11 and the P-type semiconductor region 12 form a PN junction. The P-type semiconductor region 12 enables suppression of noise of an interface.

A P-type semiconductor region 14 is a well. An N-type semiconductor region 13 is disposed below the N-type semiconductor region 11. Impurity concentration of the N-type semiconductor region 13 is lower than that of the N-type semiconductor region 11. Accordingly, charge generated in a deep position is collected in the N-type semiconductor region 11. Here, the N-type semiconductor region 13 may be a P-type semiconductor region 13. A P-type semiconductor region 17 serving as a potential barrier relative to charge is disposed below the N-type semiconductor region 13.

The holding unit 2 includes an N-type semiconductor region 201. The N-type semiconductor region 201 holds charge corresponding to a signal. Impurity concentration of the N-type semiconductor region 201 is higher than that of the N-type semiconductor region 11.

A gate electrode 40 constitutes a gate of the first transfer switch 4. Furthermore, a gate electrode 50 constitutes a gate of the second transfer switch 5. A portion of the gate electrode 40 overlaps with the N-type semiconductor region 201 through a gate insulation film. A hole may be induced on a surface of the N-type semiconductor region 201 by applying a negative voltage to the gate electrode 40. By this, noise generated in an interface may be suppressed.

Light to the holding unit 2 is blocked by a light shielding unit 203. The light shielding unit 203 is formed by metal, such as tungsten or aluminum, through which visible light is difficult to pass. A color filter 100 and a micro lens 101 are disposed on an opening of the light shielding unit 203.

The photoelectric conversion unit 1 and the holding unit 2 are disposed on a semiconductor substrate. In this embodiment, an area of orthogonal projection of the photoelectric conversion unit 1 to a surface which is parallel to a surface of the semiconductor substrate is smaller than an area of orthogonal projection of the holding unit 2 to the same surface. With this configuration, the saturation charge quantity of the pixels may be effectively increased while reduction of noise is realized.

To increase the saturation charge quantity of the pixels, the holding units 2 preferably have a large saturation charge quantity. When the impurity concentration of the N-type semiconductor region 201 in the holding unit 2 is increased or the area of the N-type semiconductor region 201 is increased in a plan view, the saturation charge amount of the holding unit 2 may be increased. However, when the impurity concentration of the N-type semiconductor region 201 is high, leakage current or the like is likely to be large, and therefore, noise may be increased. Therefore, the saturation charge amount may be increased by increasing the area of the N-type semiconductor region 201 in a plan view while the impurity concentration of the N-type semiconductor region 201 is suppressed.

As described above, when the areas of the holding units 2 in a plan view, that is, the areas of the orthogonal projection of the holding units 2 are increased, the saturation charge quantity of the pixels may be increased while noise is reduced. In this case, areas of the photoelectric conversion units 1 are relatively likely to be small in a plan view, and it is difficult to increase the saturation charge quantity of the photoelectric conversion units 1. Accordingly, even though the saturation charge quantity of the photoelectric conversion units 1 are small, the saturation charge quantity of the pixels are more effectively maintained.

Figure 3:
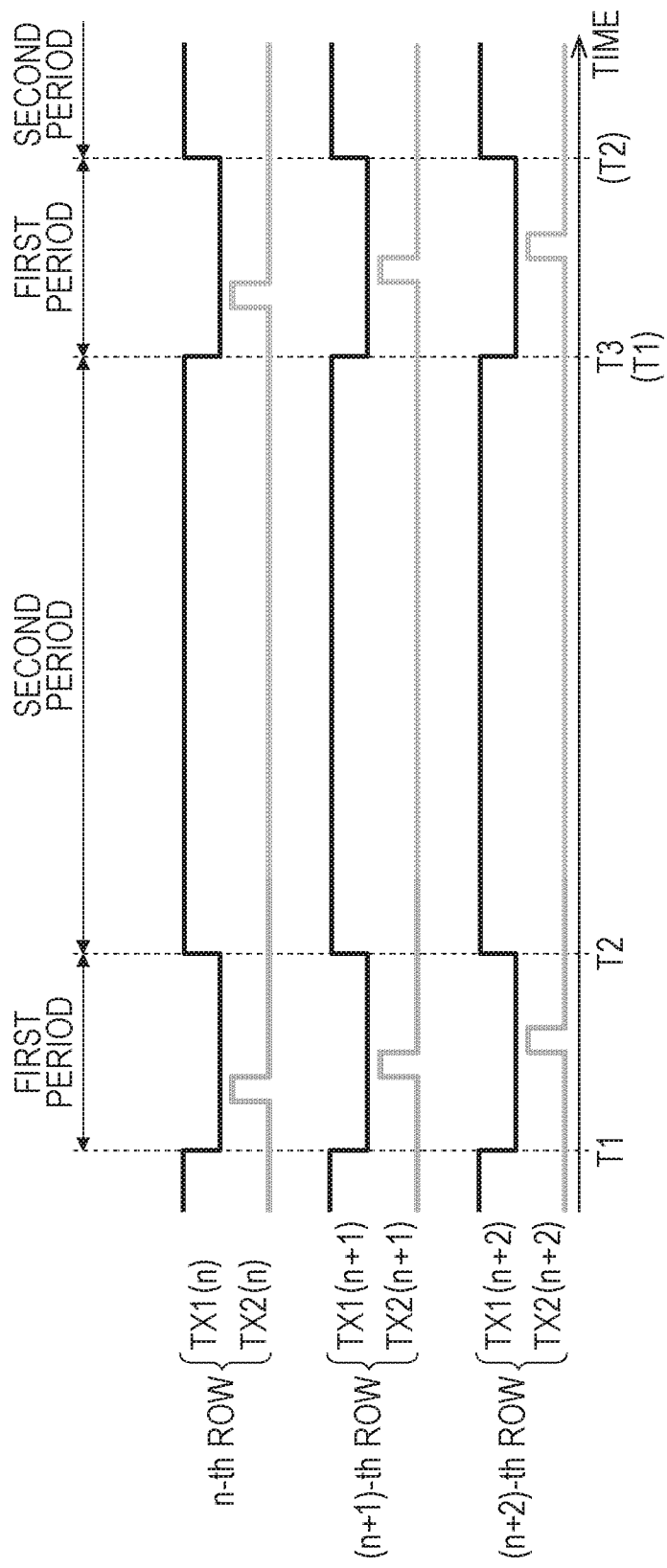
FIG. 3 is a diagram illustrating driving pulses of the image pickup apparatus.

A method for driving the image pickup apparatus of this embodiment will be described. FIG. 3 is a diagram schematically illustrating driving pulses according to this embodiment. In FIG. 3, driving pulses supplied to the control lines Tx1 of the first transfer switches 4 and the control lines Tx2 of the second transfer switches 5 of the pixels in the n-th row to an (n+2)-th row are illustrated. When a driving pulse is in a high level, a corresponding transistor or a corresponding switch is turned on. When a driving pulse is in a low level, a corresponding transistor or a corresponding switch is turned off. These driving pulses are supplied by a control unit included in the image pickup apparatus. A logic circuit, such as a shift register or an address decoder, is used as the control unit.

First, a preceding frame is exposed before a time point T1. The term "exposure" means that charge generated by photoelectric conversion is stored or held as a signal. Charges generated before the time point T1 are held by the holding units 2. When the first transfer switches 4 for the charges supplied from the photoelectric conversion units 1 to the holding units 2 of all the pixels are simultaneously turned off, the exposure of the preceding frame is terminated (at the time point T1 of FIG. 1).

Furthermore, at the time point T1, all charges of the photoelectric conversion units 1 are transferred to the holding units 2. That is, the photoelectric conversion units 1 enter an initial state. Therefore, at the time point T1, the photoelectric conversion units 1 of the pixels in the three rows simultaneously start storage of charges. In this way, the storage of the charges by the photoelectric conversion units 1 is started when the first transfer switches 4 are turned off in this embodiment.

In a first period from the time point T1 to a time point T2, off states of the first transfer switches 4 are maintained. In this embodiment, off states of the first transfer switches 4 of all the pixels are maintained. However, it is sufficient that an off state of the first transfer switch 4 of at least one of the pixels is maintained in the period from the time point T1 to the time point T2.

The time point T2 is reached when the first period is elapsed after the time point T1. Specifically, the first period corresponds to the period from the time point T1 to the time point T2. In the first period, the charges generated in the first period are stored in the photoelectric conversion units 1. Meanwhile, the holding units 2 hold the charges generated in the preceding frame in the first period.

In the first period, the charges in the holding units 2 are sequentially read to the input nodes 3 of the amplification units 10. Specifically, when the second transfer switches 5 in the n-th row are turned on, the charges of the holding units 2 of the pixels in the n-th row are transferred to the input nodes 3. Voltages of the input nodes 3 are changed in accordance with capacitances of the input nodes 3 and amounts of the transferred charges. The amplification units 10 output signals based on the voltages of the input nodes 3 to the output lines 8. Next, the same operation is performed on pixels in the (n+1)-th row. This operation is performed on pixels from a first row to pixels in a last row. After the reading is performed on a last pixel, the first transfer switches 4 and the second transfer switches 5 of all the pixels are in an off state.

At the time point T2, the first transfer switches 4 are turned on. By this, the charges of the photoelectric conversion units 1 are transferred to the holding units 2. Specifically, the charges generated in the first period are held by the holding unit 2 after the time point T2. In this embodiment, the off states of the first transfer switches 4 of all the pixels are simultaneously changed to on states. However, it is sufficient that the first transfer switches 4 of the pixels are in on states by the time point T2, and timings of the change may be shifted from one another. For example, the first transfer switches 4 of the pixels which have been subjected to the reading operation described above may be successively turned on.

Thereafter, in a second period from the time point T2 to a time point T3, the holding units 2 hold the charges generated in the first period and charges generated in the second period. In this embodiment, the on states of the first transfer switches 4 are maintained in the second period. Therefore, the charges generated in the second period are immediately transferred to the holding units 2. Note that a period of time in which the charges are transferred from the photoelectric conversion units 1 to the holding units 2 may be arbitrarily set. In a portion of the second period, the first transfer switches 4 may be in an off state.

At the time point T3, the on states of the first transfer switches 4 of the pixels in all the rows are simultaneously changed to off states. By this, an exposure period for one frame is terminated. As described above, exposure periods of all the pixels match one another. Specifically, in all the pixels, exposure is started at the time point T1 and terminated at the time point T3. Furthermore, exposure of a next frame is started at the time point T3, and thereafter, the operation from the time point T1 to the time point T3 is repeatedly performed.

Figure 4:
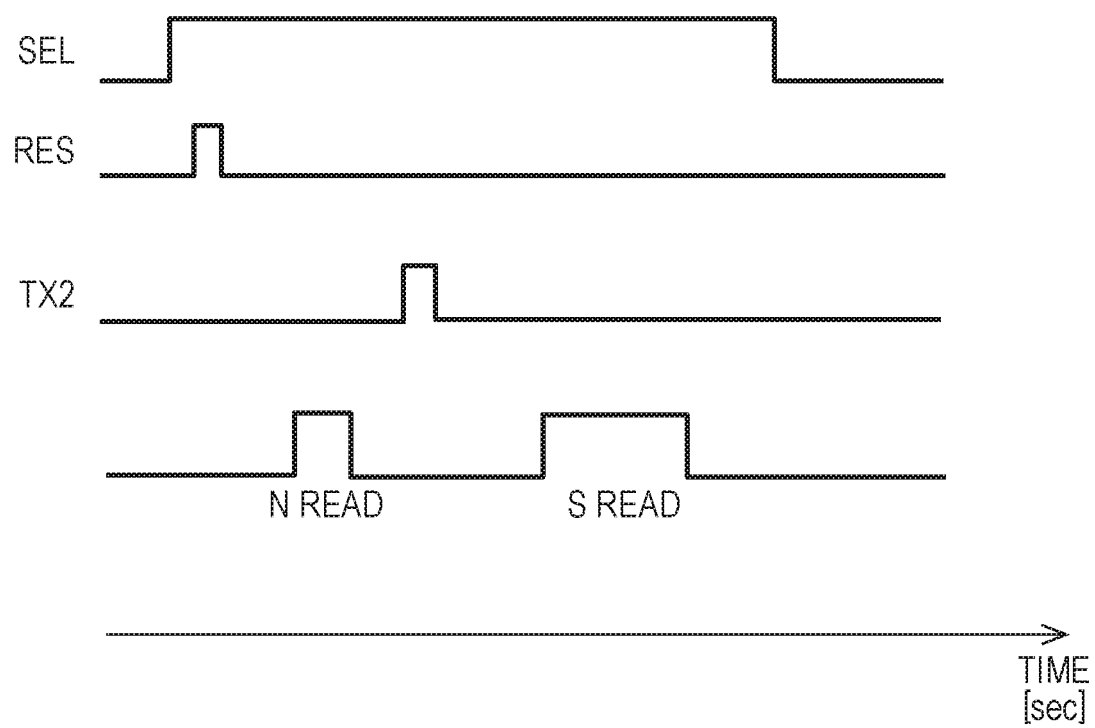
FIG. 4 is a diagram illustrating driving pulses of the image pickup apparatus.

Next, the operation of reading a signal from one pixel will be briefly described. FIG. 4 is a diagram schematically illustrating driving pulses used in the image pickup apparatus. In FIG. 4, a driving pulse SEL to be supplied to the selection transistor 7, a driving pulse RES to be supplied to the reset transistor 9, and a driving pulse TX2 to be supplied to the second transfer switch 5 are illustrated. When a driving pulse is in a high level, a corresponding transistor or a corresponding switch is turned on. When a driving pulse is in a low level, a corresponding transistor or a corresponding switch is turned off.

In accordance with the driving pulses illustrated in FIG. 4, selection of pixels, resetting, reading of a noise signal (N read), transfer of charges, and reading of an optical signal (S read) are performed. An output signal may be subjected to AD conversion in an outside of the image pickup apparatus. The AD conversion may be performed in an inside of the image pickup apparatus.

Figure 5:
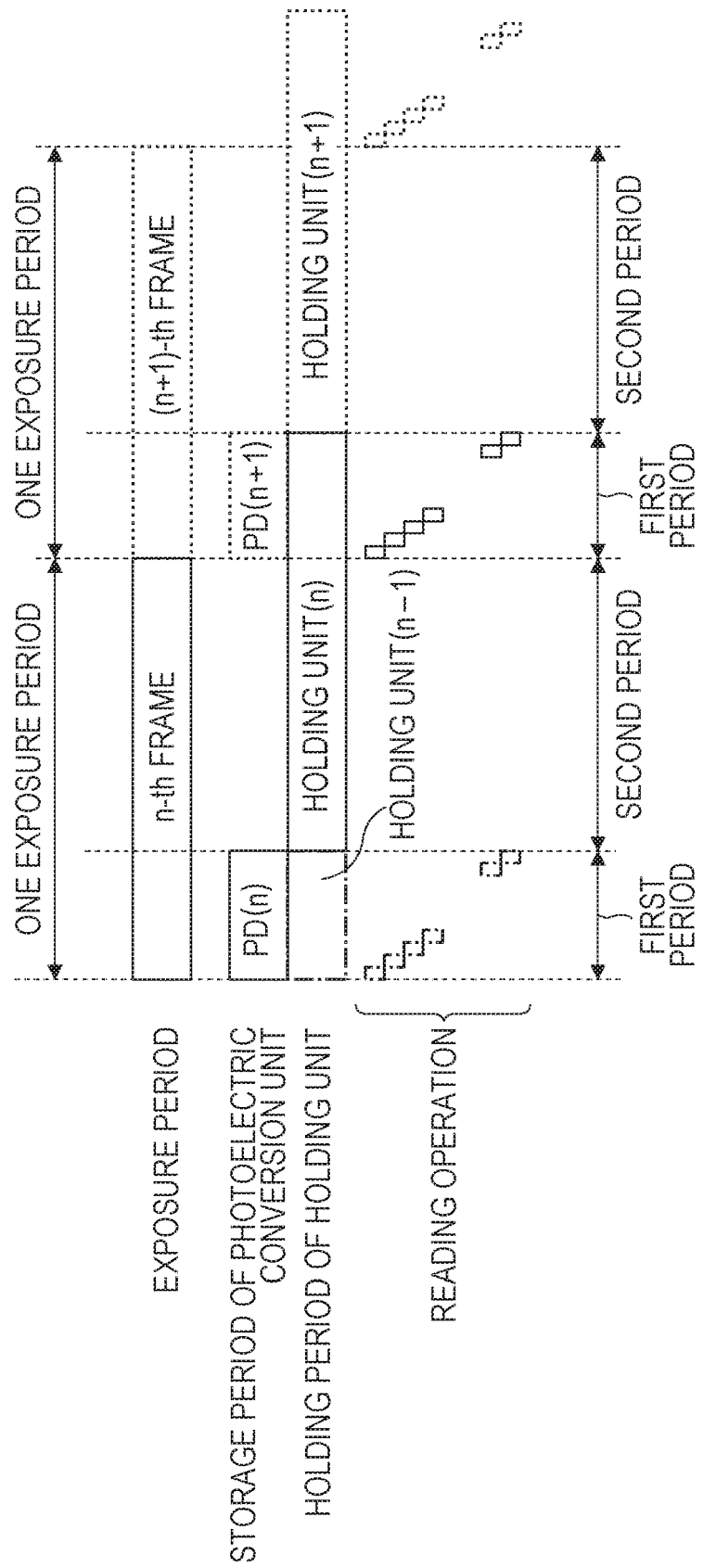
FIG. 5 is a diagram schematically illustrating an operation of the image pickup apparatus.

Next, an effect of this embodiment will be described. FIG. 5 is a diagram schematically illustrating an operation of the image pickup apparatus. In FIG. 5, an image pickup operation performed on the n-th frame to the (n+1)-th frame is illustrated. An operation performed on the n-th frame is denoted by a solid line and an operation performed on the (n+1)-th frame is denoted by a dotted line.

In FIG. 5, exposure periods of the frames, periods of time in which the photoelectric conversion units 1 store charges, and periods of time in which the holding units 2 hold charges are illustrated. According to FIG. 5, a reading operation is performed on a plurality of pixels in the first period. The reading operation in FIG. 5 includes transfer of charges using the second transfer switches 5 and output of signals performed by the amplification units 10 described with reference to FIGS. 3 and 4.

As illustrated in FIG. 5, immediately after exposure of one frame is terminated, next exposure may be started. By this, a period of time in which information lacks is substantially eliminated, and accordingly, image quality may be improved.

Furthermore, as illustrated in FIG. 5, the reading operation is individually performed on the pixels during the first period in which the photoelectric conversion units 1 store the charges. Accordingly, even when saturation charge quantity of the photoelectric conversion units 1 is small, saturation charge quantity of the pixels may be increased. The saturation charge quantity of the pixel corresponds to the maximum value of charge amounts that is used as a signal in charges generated in one exposure, or a single frame. The saturation charge quantity of the photoelectric conversion units 1 corresponds to the maximum value of amounts of charges allowed to be stored in the photoelectric conversion units 1. The saturation charge quantity of the holding units 2 corresponds to the maximum value of amounts of charges allowed to be stored in the holding units 2.

One exposure period is obtained as a sum of the first period and the second period. Here, charges of a preceding frame held in the holding units 2 are read in the first period. Therefore, after the first period, the holding units 2 may hold charges. Accordingly, it is sufficient that the photoelectric conversion units 1 at least store charges generated in the first period. Normally, amounts of charges generated in the first period are smaller than those generated in one exposure period, and accordingly, the saturation charge quantity of the photoelectric conversion units 1 may be reduced.

As illustrated in FIG. 5, in this embodiment, the second period in which the holding units 2 hold the charges is longer than the first period. Therefore, the saturation charge quantity of the photoelectric conversion units 1 may be further reduced. However, the first period may be equal to the second period, or the first period may be longer than the second period.

In FIG. 5, a case where the reading operation is successively performed from the first row is illustrated as an example. However, order of the reading operation is not limited to this example. The reading operation is performed at least once on each of the pixels included in one frame in the first period. Furthermore, in at least some of the pixels, a period of time from when the holding units 2 start holding of charges in a certain frame to when the holding units 2 start holding of charges in a next frame is equal to the exposure time.

It is preferable that a ratio of a sum of the first period and the second period to the first period is substantially the same as a ratio of a saturation charge quantity of the holding unit 2 to a saturation charge amount of the photoelectric conversion unit 1. Here, the sum of the first period and the second period corresponds to one exposure period.

In this embodiment, a ratio of one exposure period to the first period is 4:1. That is, the first period corresponds to a quarter of one exposure period. In a case where a moving image of 60 frames per second is to be captured, for example, the first period corresponds to $1/240$ seconds.

Therefore, it is preferable that a ratio of a saturation charge quantity of the holding unit 2 to a saturation charge quantity of the photoelectric conversion unit 1 is close to 4:1. This is because, although the holding unit 2 holds all charge generated in one exposure period, the photoelectric conversion unit 1 holds at least a quarter of the charge. This ratio of the saturation charge quantity enables optimization of sizes of the photoelectric conversion unit 1 and the holding unit 2.

Note that the image pickup apparatus of this embodiment may have an operation mode for performing rolling shutter. In the operation mode for the rolling shutter, the photoelectric conversion units 1 of the pixels successively start storage of charges. Thereafter, the first transfer switches 4 of the pixels are successively turned on. The image pickup apparatus of this embodiment may further have an operation mode for global electronic shutter employing another method. Examples of the global electronic shutter employing another method include an operation in which a period of time in which the photoelectric conversion units 1 store charges becomes equal to the exposure period.

As described above, according to the image pickup apparatus of this embodiment, the global electronic shutter may be operated while the saturation charge quantity is increased.

Second Embodiment

A second embodiment will be described. In this embodiment, a configuration of holding units is different from that of the first embodiment. Therefore, only portions different from those of the first embodiment are described and descriptions of portions the same as those of the first embodiment are omitted.

An equivalent circuit of this embodiment is the same as that of the first embodiment.

Specifically, FIG. 1 is a diagram illustrating equivalent circuits of pixels of an image pickup apparatus of this embodiment. Since a description of FIG. 1 is the same as that of the first embodiment, the description is omitted here.

A driving method of this embodiment is the same as that of the first embodiment. Specifically, FIGS. 3 and 4 are diagrams schematically illustrating driving pulses according to this embodiment. Furthermore, FIG. 5 is a diagram schematically illustrating an operation of the image pickup apparatus of this embodiment. Since descriptions of FIGS. 3 to 5 are the same as those of the first embodiment, the descriptions are omitted here.

Figure 6:
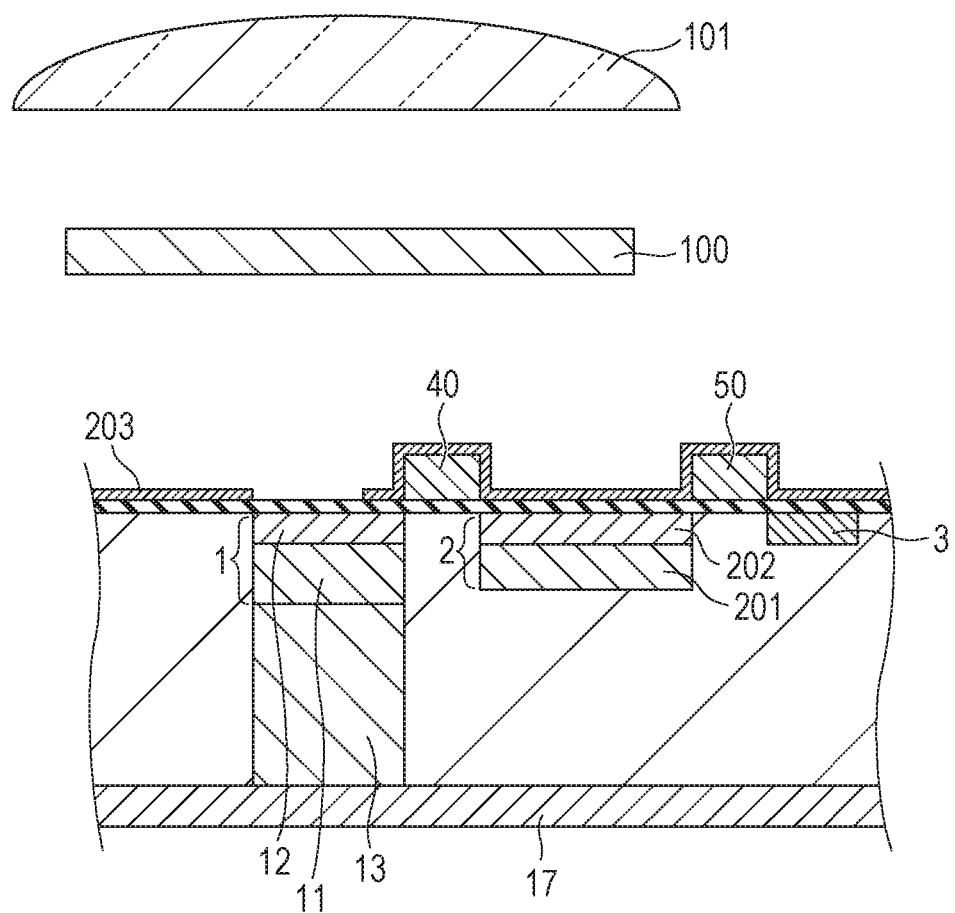
FIG. 6 is a diagram schematically illustrating a cross-section structure of the image pickup apparatus.

FIG. 6 is a diagram schematically illustrating a cross-section structure of the image pickup apparatus. In FIG. 6, a cross section of a pixel is illustrated. Portions having functions the same as those of FIGS. 1 to 5 are denoted by reference numerals the same as those in FIGS. 1 to 5.

A holding unit 2 includes an N-type semiconductor region 201 and a P-type semiconductor region 202. The P-type semiconductor region 202 is disposed on the N-type semiconductor region 201. The P-type semiconductor region 202 enables suppression of noise of an interface.

Furthermore, a gate electrode 40 of a first transfer switch 4 does not extend on the N-type semiconductor region 201. Therefore, restriction of layout is eased, and a degree of freedom of design may be enhanced.

As described above, according to this embodiment, in addition to the effect of the first embodiment, noise may be reduced.

Third Embodiment

A third embodiment will be described. This embodiment is different from the first and second embodiments in that pixels have discharge switches. Therefore, only portions different from those of the first and second embodiments are described and descriptions of portions the same as those of the first and second embodiments are omitted.

Figure 7:
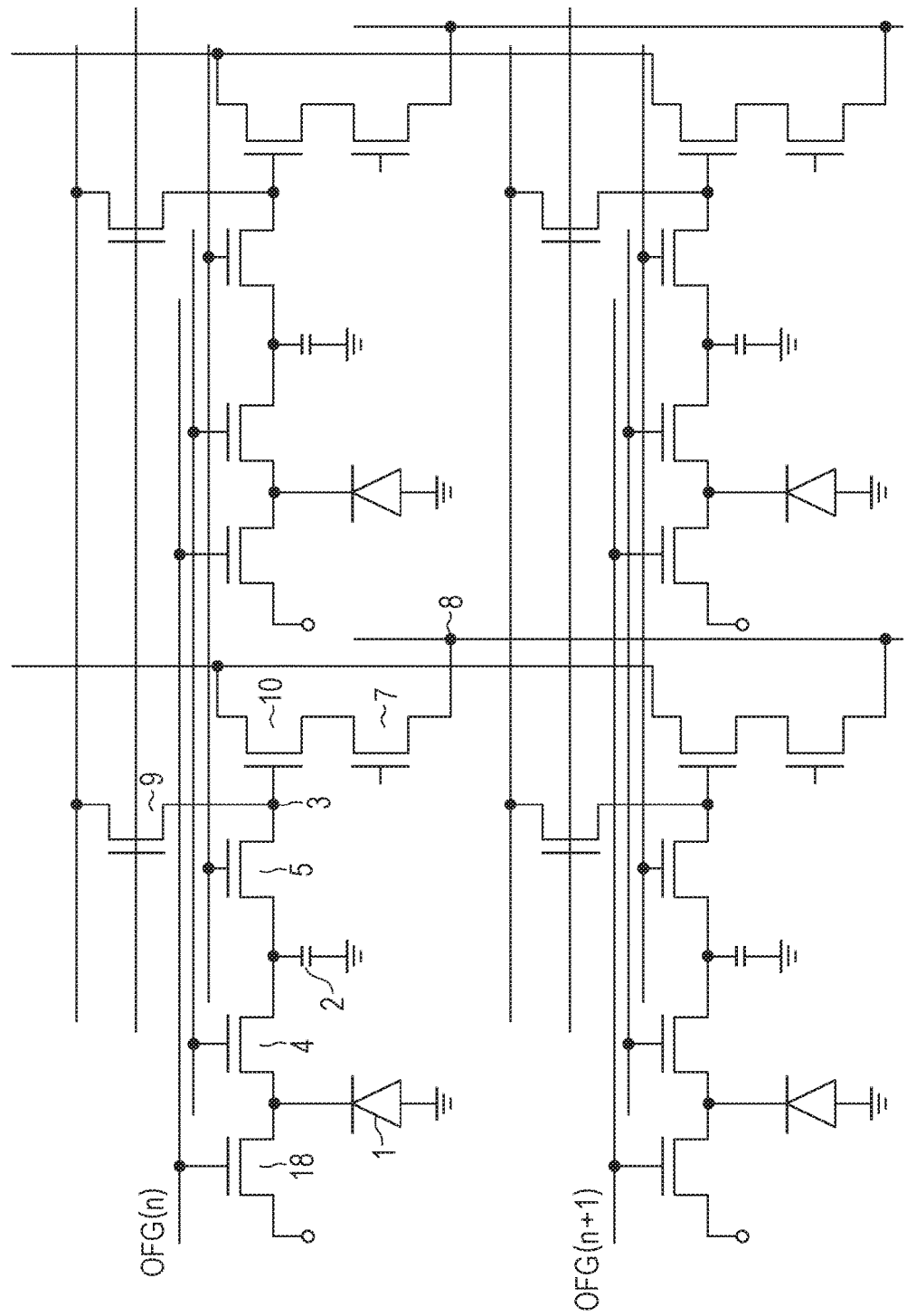
FIG. 7 is a diagram illustrating an equivalent circuit of an image pickup apparatus.

FIG. 7 is a diagram illustrating equivalent circuits of pixels of an image pickup apparatus. Portions the same as those of FIG. 1 are denoted by reference numerals the same as those of FIG. 1. Note that, for simplicity of the drawings, reference numerals of control lines Tx1 and Tx2 are omitted. The control lines Tx1 and Tx2 have configurations the same as those of the first embodiment.

Each of pixels has a discharge switch 18. The discharge switch 18 discharges charge of a photoelectric conversion unit 1 to a power source node, such as an overflow drain. A control line OFG is connected to the discharge switch 18. The discharge switch 18 is a MOS transistor, for example.

Figure 9:
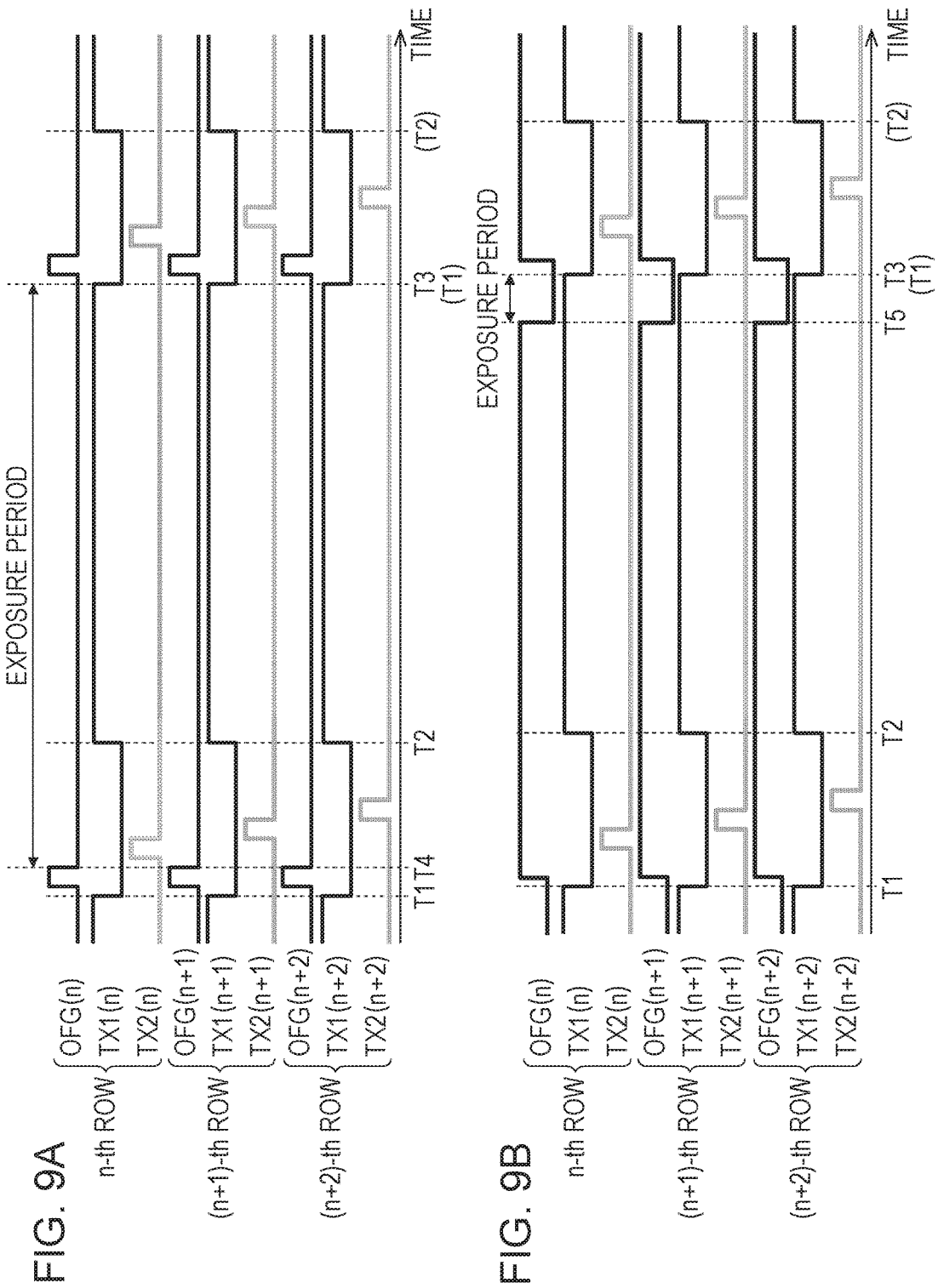
FIGS. 9A and 9B are diagrams illustrating driving pulses of the image pickup apparatus.

In the first embodiment, storage of charge in the photoelectric conversion unit 1 is started by changing a state of a second transfer switch 5 from an on state to an off state. In this embodiment, as illustrated in FIGS. 9A and 9B, start of exposure may be controlled by controlling the discharge switch 18. Specifically, storage of charge in the photoelectric conversion unit 1 is started by changing a state of the discharge switch 18 from an on state to an off state. By this, an exposure period may be arbitrarily set.

Figure 8:
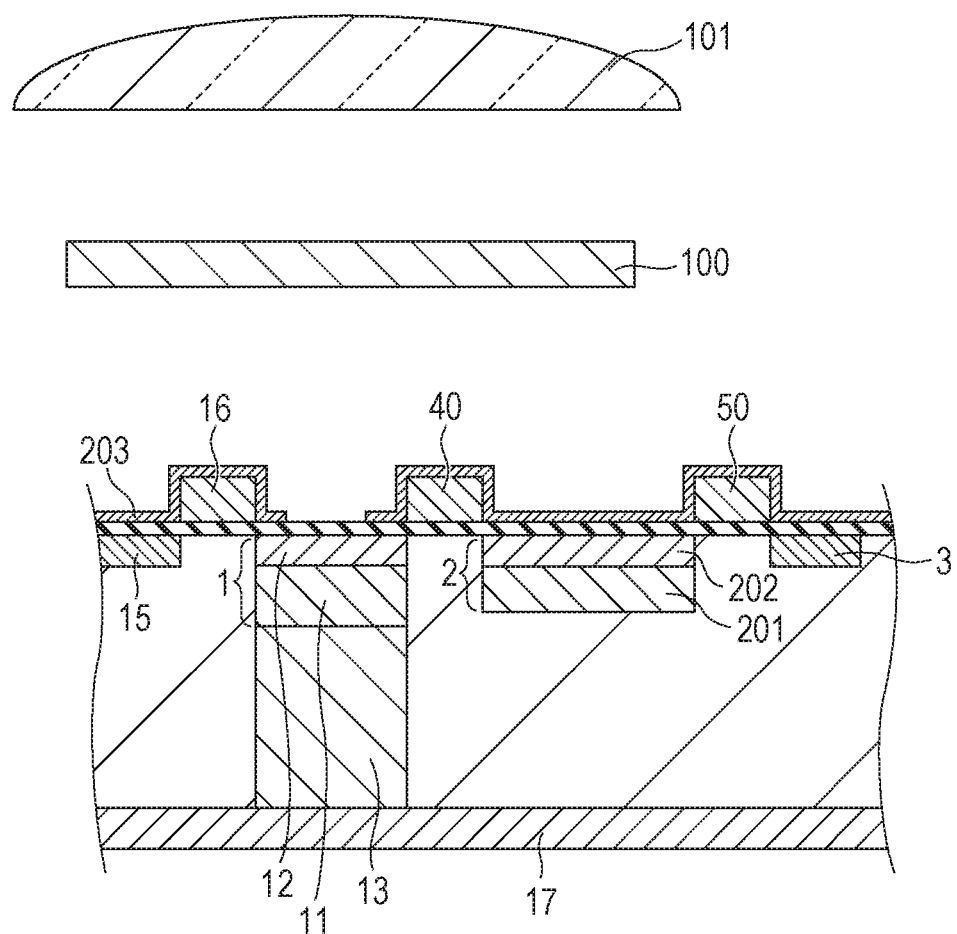
FIG. 8 is a diagram schematically illustrating a cross-section structure of the image pickup apparatus.

FIG. 8 is a diagram schematically illustrating a cross-section structure of the image pickup apparatus. Portions having functions the same as those of FIGS. 1 and 2 are denoted by reference numerals the same as those in FIGS. 1 and 2. FIG. 8 is a diagram illustrating a case where, as with the second embodiment, a holding unit 2 includes a P-type semiconductor region 202 as an example. The holding unit 2 may not include the P-type semiconductor region 202 as illustrated in FIG. 1.

The discharge switch 18 includes an overflow control electrode 16 and an overflow drain 15. Charge of a photoelectric conversion unit 1 is discharged to the overflow drain 15 in accordance with a voltage supplied to the overflow control electrode 16. A predetermined voltage is supplied to the overflow drain 15. Light to the overflow control electrode 16 and the overflow drain 15 is blocked by the light shielding unit 203.

A method for driving the image pickup apparatus of this embodiment will be described. FIGS. 9A and 9B are diagrams schematically illustrating driving pulses according to this embodiment. In FIGS. 9A and 9B, driving pulses supplied to control lines Tx1 and Tx2 and the control line OFG in an n-th row to a (n+2)-th row are illustrated. The driving pulses supplied to the control lines Tx1 and Tx2 are the same as those of the first embodiment.

When a driving pulse is in a high level, a corresponding transistor or a corresponding switch is turned on. When a driving pulse is in a low level, a corresponding transistor or a corresponding switch is turned off. These driving pulses are supplied by a control unit included in the image pickup apparatus. A logic circuit, such as a shift register or an address decoder, is used as the control unit.

Timings when the discharge switch 18 is operated in FIGS. 9A and 9B are different from each other. In FIG. 9A, a state of the discharge switch 18 is changed from an on state to an off state at a time point T4. While the discharge switch 18 is in an on state, generated charge is discharged. Therefore, according to driving illustrated in FIG. 9A, an exposure period corresponds to a period from the time point T4 to a time point T3. In FIG. 9B, a state of the discharge switch 18 is changed from an on state to an off state at a time point T5. Therefore, according to driving illustrated in FIG. 9B, an exposure period corresponds to a period from the time point T5 to the time point T3.

According to this embodiment, a driving method may be changed in accordance with brightness of an object. For example, the driving pulses illustrated in FIG. 3 are used in a normal state, the driving pulses illustrated in FIG. 9A are used in a case of high brightness, and the driving pulses illustrated in FIG. 9B are used in a case of higher brightness.

Note that, in FIG. 9A, storage of charge in the photoelectric conversion unit 1 is started at the time point T4. Thereafter, in a period from the time point T4 to the time point T3, an off state of the discharge switch 18 is maintained. A reading operation is performed in accordance with the driving pulses illustrated in FIG. 4.

According to this embodiment, in addition to the effect of the first embodiment, the exposure period may be arbitrarily set.

Fourth Embodiment

A fourth embodiment will be described. This embodiment is different from the first to third embodiments in that a waveguide which guides light to a photoelectric conversion unit is provided. Therefore, only portions different from those of the first to third embodiments are described and descriptions of portions the same as those of one of the first to third embodiments are omitted.

An equivalent circuit of this embodiment is the same as those of the first embodiment or the third embodiment. Specifically, FIGS. 1 and 7 are diagrams illustrating equivalent circuits of pixels of an image pickup apparatus of this embodiment. Since descriptions of FIGS. 1 and 7 are the same as those of the first and third embodiments, the descriptions are omitted here.

A driving method of this embodiment is the same as that of the first embodiment or the third embodiment. Specifically, when a discharge switch is not provided, the driving pulses illustrated in FIGS. 3 and 4 are used. When each of pixels has a discharge switch, the driving pulses illustrated in FIGS. 9A, 9B, and 4 are used. Furthermore, FIG. 5 is a diagram schematically illustrating an operation of the image pickup apparatus of this embodiment. Since descriptions of FIGS. 3 to 5 and FIGS. 9A and 9B are the same as those of the first and third embodiments, the descriptions are omitted here.

Figure 10:
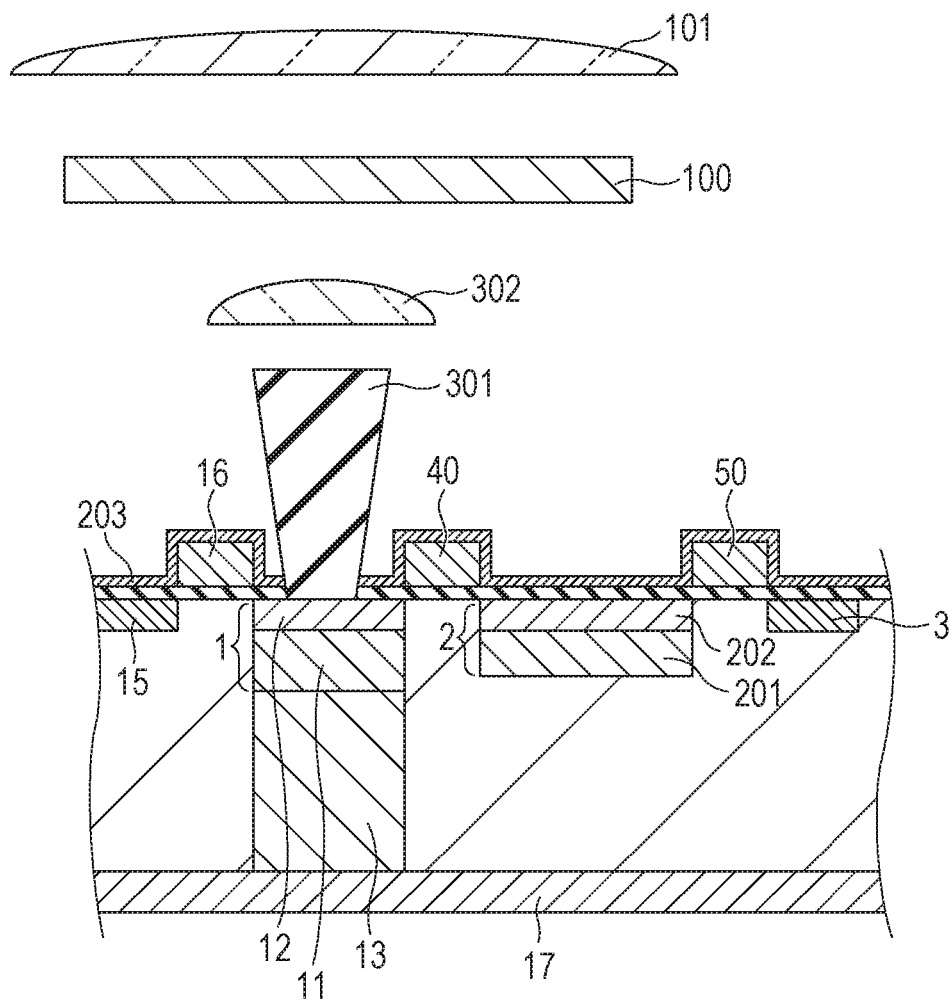
FIG. 10 is a diagram schematically illustrating a cross-section structure of an image pickup apparatus.

FIG. 10 is a diagram schematically illustrating a cross-section structure of the image pickup apparatus. Portions the same as those of FIGS. 1, 2, 6, 7, and 8 are denoted by reference numerals the same as those of FIGS. 1, 2, 6, 7, and 8. In FIG. 10, a case where a holding unit 2 includes a P-type semiconductor region 202 as with the second embodiment and a pixel includes a discharge switch 18 as with the third embodiment is illustrated as an example. However, the P-type semiconductor region 202 and the discharge switch 18 may be omitted.

In this embodiment, a waveguide 301 is provided so as to correspond to a photoelectric conversion unit 1. The waveguide 301 guides incident light to the photoelectric conversion unit 1. By this, sensitivity may be improved. In particular, degradation of sensitivity of light which is obliquely incident may be reduced.

The waveguide 301 has a general structure. In this embodiment, the waveguide 301 is formed by a material having a refractive index higher than that of a surrounding insulation film. An interlayer insulation film formed by a silicon oxide film is used as the surrounding insulation film, and a silicon nitride film is used as the waveguide 301, for example. Alternatively, a reflection layer is provided so as to surround the waveguide 301. The waveguides 301 may be disposed for the individual photoelectric conversion units 1 of all pixels or only for photoelectric conversion units 1 of some of the pixels.

An interlayer lens 302 may be disposed between a color filter 100 and the waveguide 301. The interlayer lens 302 collects light which passes through the color filter 100 in the waveguide 301. Use of the interlayer lens 302 may improve sensitivity. In particular, degradation of sensitivity of light which is obliquely incident may be reduced.

As described above, according to this embodiment, in addition to the effect of the first embodiment, sensitivity may be improved. In particular, the effect of improvement of the sensitivity is remarkable when an area of the photoelectric conversion unit 1 is reduced in a plan view so that an area of the holding unit 2 is increased in the plan view.

Fifth Embodiment

A fifth embodiment will be described. In this embodiment, a configuration of a holding unit is different from those of the first to fourth embodiments. Therefore, only portions different from those of the first to fourth embodiments are described and descriptions of portions the same as those of one of the first to fourth embodiments are omitted.

An equivalent circuit of this embodiment is the same as that of the first embodiment or the third embodiment. Specifically, FIGS. 1 and 7 are diagrams illustrating equivalent circuits of pixels of an image pickup apparatus of this embodiment. Since descriptions of FIGS. 1 and 7 are the same as those of the first and third embodiments, the descriptions are omitted here.

A driving method of this embodiment is the same as those of the first embodiment or the third embodiment. Specifically, when a discharge switch is not provided, the driving pulses illustrated in FIGS. 3 and 4 are used. On the other hand, when a discharge switch is provided, the driving pulses illustrated in FIGS. 9A, 9B, and 4 are used. Furthermore, FIG. 5 is a diagram schematically illustrating an operation of the image pickup apparatus of this embodiment. Since descriptions of FIGS. 3 to 5 and FIGS. 9A and 9B are the same as those of the first and third embodiments, the descriptions are omitted here.

Figure 11:
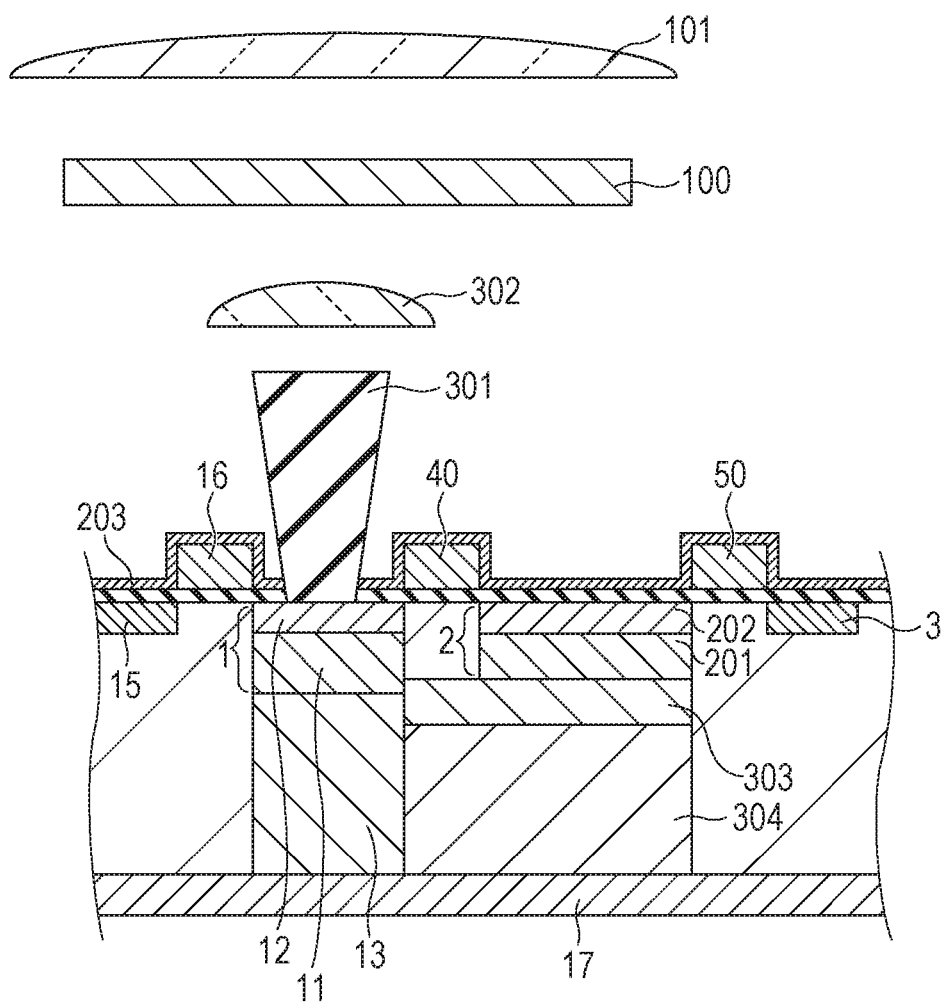
FIG. 11 is a diagram schematically illustrating a cross-section structure of an image pickup apparatus.

FIG. 11 is a diagram schematically illustrating a cross-section structure of the image pickup apparatus. Portions the same as those of FIGS. 1, 2, 6, 7, 8, and 10 are denoted by reference numerals the same as those of FIGS. 1, 2, 6, 7, 8, and 10. In FIG. 11, a case where a holding unit 2 includes a P-type semiconductor region 202 as with the second embodiment and a pixel includes a discharge switch 18 as with the third embodiment is illustrated as an example. However, the P-type semiconductor region 202 and the discharge switch 18 may be omitted. Furthermore, in FIG. 11, a case where a waveguide 301 and an interlayer lens 302 are disposed is illustrated as an example. However, the waveguide 301 and the interlayer lens 302 may be omitted.

In this embodiment, a P-type semiconductor region 303 and a P-type semiconductor region 304 are disposed below the N-type semiconductor region 201 which is included in the holding unit 2 and which holds charge. The P-type semiconductor region 304 is disposed below the P-type semiconductor region 303. Impurity concentration of the P-type semiconductor region 303 is higher than that of the P-type semiconductor region 304. With this configuration, charge of a deep portion of a substrate is prevented from intruding into the N-type semiconductor region 201. As a result, noise may be reduced.

Furthermore, in this embodiment, the P-type semiconductor region 304 extends to a P-type semiconductor region 17. With this configuration, color mixture of charges of pixels may be reduced.

As described above, according to this embodiment, in addition to the effect of the first embodiment, noise may be reduced.

Sixth Embodiment

A sixth embodiment will be described. A driving method of this embodiment is different from those of the first to fifth embodiments. Therefore, only portions different from those of the first to fifth embodiments are described and descriptions of portions the same as those of one of the first to fifth embodiments are omitted.

An equivalent circuit of this embodiment is the same as that of the first embodiment or the third embodiment. Specifically, FIGS. 1 and 7 are diagrams illustrating equivalent circuits of pixels of an image pickup apparatus of this embodiment. Since descriptions of FIGS. 1 and 7 are the same as those of the first and third embodiments, the descriptions are omitted here.

A cross-section structure of a pixel of this embodiment is the same as those of the first to fifth embodiments. Specifically, FIGS. 2, 6, 8, 10, and 11 are diagrams schematically illustrating a cross-section structure of a pixel of this embodiment.

Figure 12:
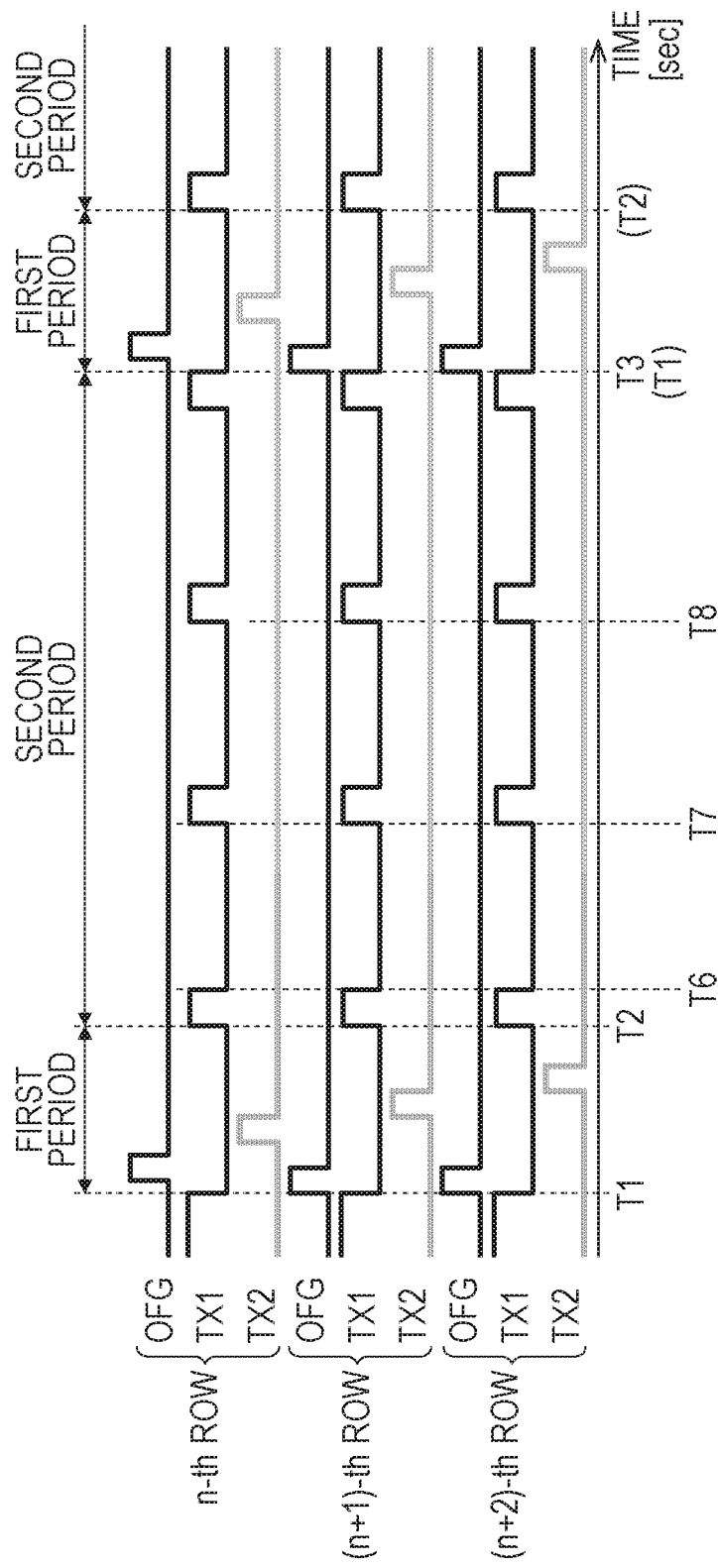
FIG. 12 is a diagram illustrating driving pulses of an image pickup apparatus.

A method for driving the image pickup apparatus of this embodiment will be described. FIG. 12 is a diagram schematically illustrating driving pulses according to this embodiment. In FIG. 12, driving pulses supplied to control lines Tx1 and Tx2 and a control line OFG in an n-th row to a (n+2)-th row are illustrated. The driving pulses supplied to the control lines Tx1 and Tx2 and the control line OFG are the same as those of the first embodiment or the third embodiment. Note that, when the pixel does not include a discharge switch 18, a driving pulse is not supplied to the control line OFG.

When a driving pulse is in a high level, a corresponding transistor or a corresponding switch is turned on. When a driving pulse is in a low level, a corresponding transistor or a corresponding switch is turned off. These driving pulses are supplied by a control unit included in the image pickup apparatus. A logic circuit, such as a shift register or an address decoder, is used as the control unit.

In this embodiment, a first transfer switch 4 is turned off in a portion of a second period. Specifically, at a time point T6, an on state of the first transfer switch 4 is changed to an off state. Thereafter, at a time point T7, the off state of the first transfer switch 4 is changed to an on state. With this configuration, a period of time in which the first transfer switch 4 is in an on state may be reduced. Consequently, noise generated by the first transfer switch 4 may be reduced.

In this embodiment, the off state of the first transfer switch 4 is changed to an on state again at a time point T8. In this way, on/off control of the first transfer switch 4 is performed a plurality of times in the second period. With this configuration, the noise may be further reduced.

Furthermore, the number of times an off state is changed to an on state is preferably equal to or larger than a ratio of a saturation charge amount of a holding unit 2 to a saturation charge amount of a photoelectric conversion unit 1. In this embodiment, the ratio of the saturation charge amount of the holding unit 2 to the saturation charge amount of the photoelectric conversion unit 1 is 4:1. Therefore, on/off control of the first transfer switch 4 is performed four times in the second period.

As described above, according to this embodiment, in addition to the effect of the first embodiment, noise may be reduced.

Seventh Embodiment

Figure 13:
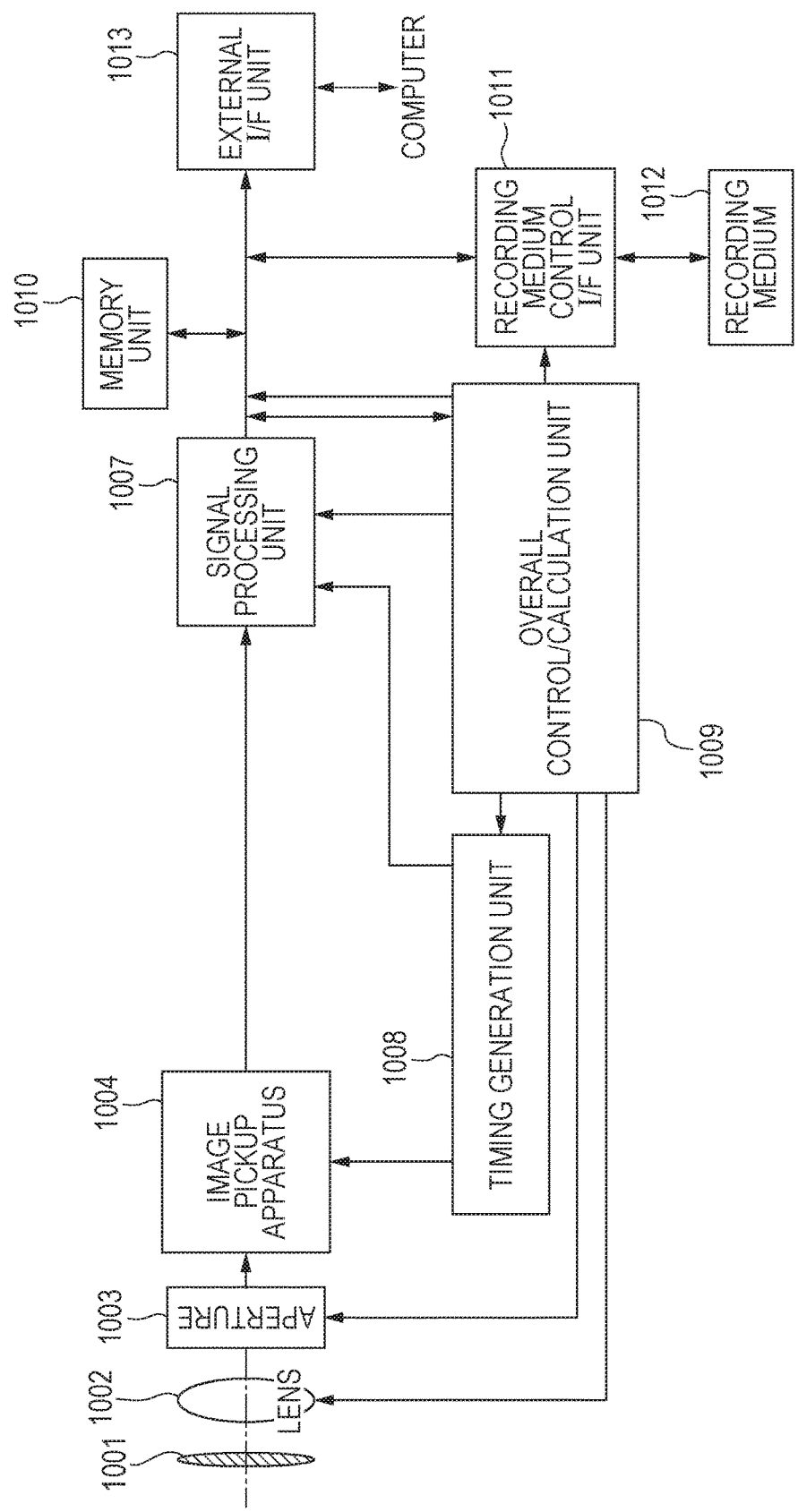
FIG. 13 is a block diagram illustrating a configuration of an image pickup system.

An embodiment of an image pickup system according to the present invention will be described. Examples of the image pickup system include a digital steel camera, a digital camcorder, a copier, a facsimile, a cellular phone, an on-vehicle camera, and an observatory. Furthermore, a camera module including an optical system, such as a lens, and an image pickup apparatus is also included in the image pickup system. FIG. 13 is a block diagram illustrating a digital still camera serving as an example of the image pickup system.

In FIG. 13, a barrier 1001 protects a lens 1002, the lens 1002 forms an optical image of an object on an image pickup apparatus 1004, and an aperture 1003 changes quantity of light which has passed the lens 1002. The image pickup apparatus described in the foregoing embodiments is denoted by a reference numeral 1004, and the image pickup apparatus 1004 converts an optical image formed by the lens 1002 into image data. Here, it is assumed that an AD conversion unit is formed on a semiconductor substrate of the image pickup apparatus 1004. A signal processing unit 1007 performs various types of correction on image pickup data output from the image pickup apparatus 1004 and compresses the image pickup data. In FIG. 13, a timing generation unit 1008 outputs various timing signals to the image pickup apparatus 1004 and the image processing unit 1007, and an overall control/calculation unit 1009 controls the entire digital still camera. A frame memory unit 1010 temporarily stores image data, an interface unit 1011 performs recording or reading on a recording medium, and a detachable recording medium 1012 is a semiconductor memory or the like for recording or reading image pickup data. An interface unit 1013 is used to communicate with an external computer and the like. Here, a timing signal or the like may be input from an outside of the image pickup system which at least includes the image pickup apparatus 1004 and the signal processing unit 1007 which processes an image pickup signal output from the image pickup apparatus 1004.

In this embodiment, a structure in which the image pickup apparatus 1004 and an AD conversion unit are disposed on the same semiconductor substrate is described. However, the image pickup apparatus 1004 and the AD conversion unit may be disposed on different semiconductor substrates. Furthermore, the image pickup apparatus 1004 and the signal processing unit 1007 may be formed on the same semiconductor substrate.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image pickup apparatus comprising:
a plurality of pixels, each pixel including a photoelectric conversion unit configured to generate charge in response to incident light and to accumulate the charge a holding unit configured to hold the charge, an amplification unit configured to output a signal based on the charge, a first transfer switch configured to transfer the charge from the photoelectric conversion unit to the holding unit, and a second transfer switch configured to transfer the charge from the holding unit to the amplification unit; and an output line to which the plurality of pixels are connected, wherein the image pickup apparatus performs a first exposure having a first exposure period and a second exposure having a second exposure period shorter than the first exposure period, the first exposure period starts at a first time point, at the first time point, the photoelectric conversion units of the plurality of pixels start accumulation of charge, the first transfer switch of at least one of the plurality of pixels is kept off from the first time point to a second time point and the photoelectric conversion unit of the at least one of the plurality of pixels accumulates charge generated in a first period from the first time point to the second time point, in the first period, the second transfer switches of the plurality of pixels are turned on and the amplification units of the plurality of pixels output the signals to the output line in turns, the first exposure period includes a second period after the first period, in the second period, the holding units of the plurality of pixels hold charge generated by the photoelectric conversion units in the first period.

2. The image pickup apparatus according to claim 1, wherein through a beginning of the second exposure period to an end of the second exposure period, a state where the first transfer switch is in an on state only comes once for each of the plurality of pixels.

3. The image pickup apparatus according to claim 2, wherein in at least a portion of the second period, the photoelectric conversion units of the plurality of pixels accumulate charge generated in the second period.

4. The image pickup apparatus according to claim 3, wherein at the third time point, the first transfer switches of the plurality of pixels transfer the charge generated by the photoelectric conversion units in the second period into the holding unit so that the holding units of the plurality of pixels hold the charge generated in the first period and the charge generated in the second period.

5. The image pickup apparatus according to claim 2, wherein at the second time point, the first transfer switch of the at least one of the plurality of pixels is controlled from off to on.

6. The image pickup apparatus according to claim 2, wherein in the second period, the first transfer switches of the plurality of pixels are kept on, and in the second period, the holding units of the plurality of pixels hold charge generated by the photoelectric conversion units in the second period.

7. The image pickup apparatus according to claim 2, wherein through the second period within the first exposure period, the second transfer switches of the plurality of pixels are kept off, and through the second exposure period, the second transfer switches of the plurality of pixels are kept off.

8. The image pickup apparatus according to claim 2, wherein each of the plurality of pixels includes a discharge switch configured to discharge charge of the photoelectric conversion unit, the discharge switch of the at least one of the plurality of pixels is kept off from the first time point to the second time point.

9. The image pickup apparatus according to claim 8, wherein the accumulation of charge is started by controlling the discharge switch from on to off.

10. The image pickup apparatus according to claim 2, wherein the accumulation of charge is started by controlling the first transfer switch from on to off.

11. The image pickup apparatus according to claim 2, wherein the holding unit includes a first semiconductor region of a first conductive type which holds the charge and a second semiconductor region of a second conductive type disposed on the first semiconductor region.

12. The image pickup apparatus according to claim 2, further comprising: waveguides disposed so as to correspond to the photoelectric conversion units of the plurality of pixels.

13. The image pickup apparatus according to claim 2, further comprising:

a semiconductor substrate including the photoelectric conversion units and the holding units disposed therein, wherein an area of an orthogonal projection of the photoelectric conversion unit onto a plane parallel to a surface of the semiconductor substrate is smaller than an area of an orthogonal projection of the holding unit onto the plane.

14. An image pickup system comprising:

the image pickup apparatus set forth in claim 2; and a signal processing apparatus which processes a signal supplied from the image pickup apparatus.

15. The image pickup apparatus according to claim 1, wherein in the second exposure period, an output of the signal by the amplification units of the plurality of pixels is not performed.

16. The image pickup apparatus according to claim 15, wherein in at least a portion of the second period, the photoelectric conversion units of the plurality of pixels accumulate charge generated in the second period.

17. The image pickup apparatus according to claim 16, wherein at the third time point, the first transfer switches of the plurality of pixels transfer the charge generated by the photoelectric conversion units in the second period into the holding unit so that the holding units of the plurality of pixels hold the charge generated in the first period and the charge generated in the second period.

18. The image pickup apparatus according to claim 15, wherein at the second time point, the first transfer switch of the at least one of the plurality of pixels is controlled from off to on.

19. The image pickup apparatus according to claim 15, wherein in the second period, the first transfer switches of the plurality of pixels are kept on, and in the second period, the holding units of the plurality of pixels hold charge generated by the photoelectric conversion units in the second period.

20. The image pickup apparatus according to claim 15, wherein through the second period within the first exposure period, the second transfer switches of the plurality of pixels are kept off, and through the second exposure period, the second transfer switches of the plurality of pixels are kept off.

21. The image pickup apparatus according to claim 15, wherein each of the plurality of pixels includes a discharge switch configured to discharge charge of the photoelectric conversion unit, the discharge switch of the at least one of the plurality of pixels is kept off from the first time point to the second time point.

22. The image pickup apparatus according to claim 21, wherein the accumulation of charge is started by controlling the discharge switch from on to off.

23. The image pickup apparatus according to claim 15, wherein the accumulation of charge is started by controlling the first transfer switch from on to off.

24. The image pickup apparatus according to claim 15, wherein the holding unit includes a first semiconductor region of a first conductive type which holds the charge and a second semiconductor region of a second conductive type disposed on the first semiconductor region.

25. The image pickup apparatus according to claim 15, further comprising: waveguides disposed so as to correspond to the photoelectric conversion units of the plurality of pixels.

26. The image pickup apparatus according to claim 15, further comprising:
   a semiconductor substrate including the photoelectric conversion units and the holding units disposed therein, wherein
   an area of an orthogonal projection of the photoelectric conversion unit onto a plane parallel to a surface of the semiconductor substrate is smaller than an area of an orthogonal projection of the holding unit onto the plane.

27. An image pickup system comprising:
   the image pickup apparatus set forth in claim 15; and
   a signal processing apparatus which processes a signal supplied from the image pickup apparatus.

* * * * *